April 26, 1927. 1,625,896
W. KEYWOOD
WATER MOTOR
Filed Nov. 1, 1926 2 Sheets-Sheet 1
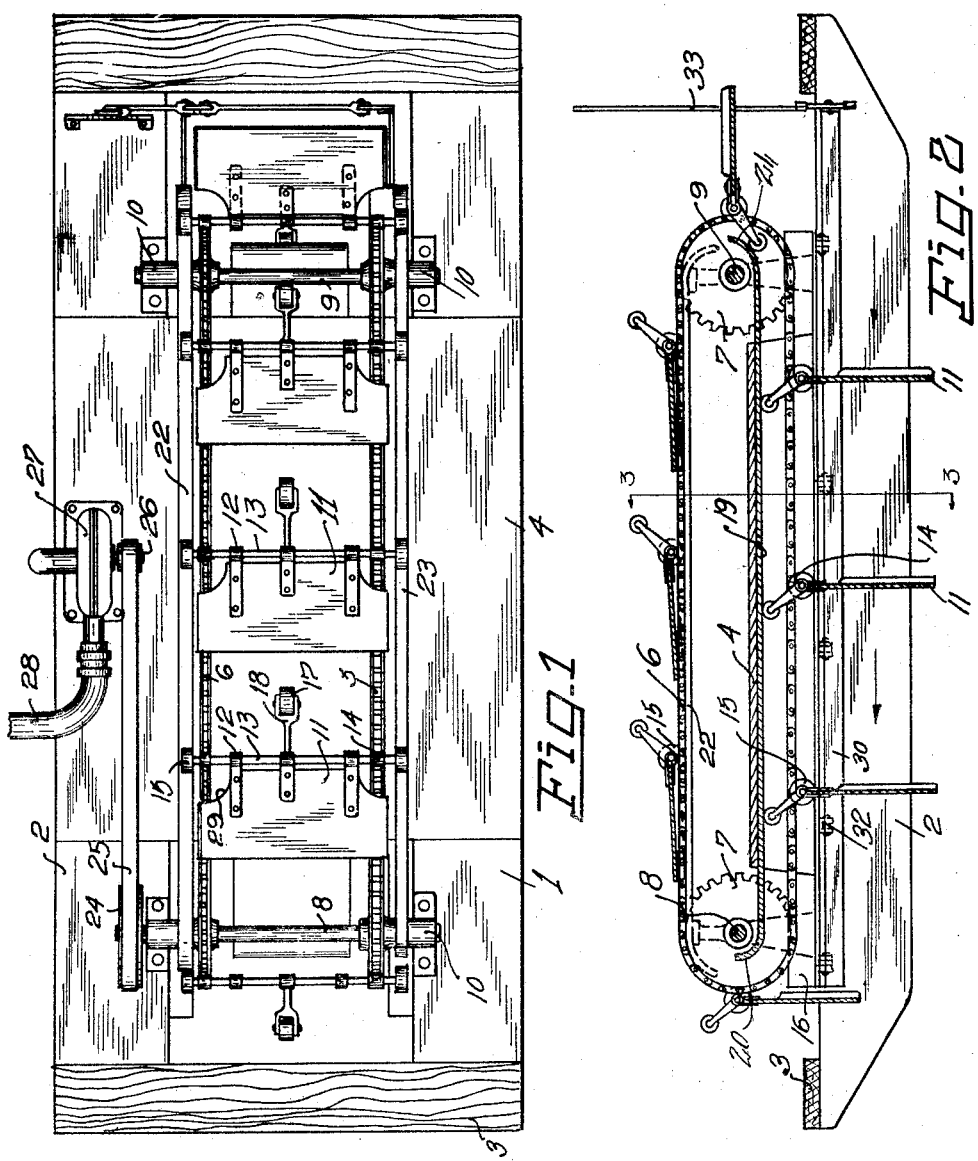
Inventor
William Keywood
By Herbert E. Smith,
Attorney William Keywood, Inventor By Herbert E. Smith, Attorney Patented Apr. 26, 1927.

1,625,896

UNITED STATES PATENT OFFICE.

WILLIAM KEYWOOD, OF EASTON, WASHINGTON.

WATER MOTOR.

Application filed November 1, 1926. Serial No. 145,622.

My present invention relates to improvements in water motors of the endless chain type adapted to be supported upon a float, and provided with spaced paddles to receive power from the flowing stream as from water in a swiftly moving river.

The primary object of my invention is the provision of a power plant or water motor of this type by means of which power may be developed and transmitted to the place of use, for numerous purposes. Means are provided for unshipping the paddles or blades carried by the endless chains and supported on the float, in order that the motor may be rendered inoperative. The invention consists in certain novel combinations and arrangements of parts as will be hereinafter more fully pointed out and claimed.

In the accompanying drawings, I have illustrated one complete example of the physical embodiment of my invention wherein the parts are combined and arranged according to the best mode I have so far devised for the practical application of the principles of my invention.

Figure 1 is a top plan view of a water motor embodying my invention;

Fig. 2 is a longitudinal sectional view of the motor in Fig. 1;

Figure 3:
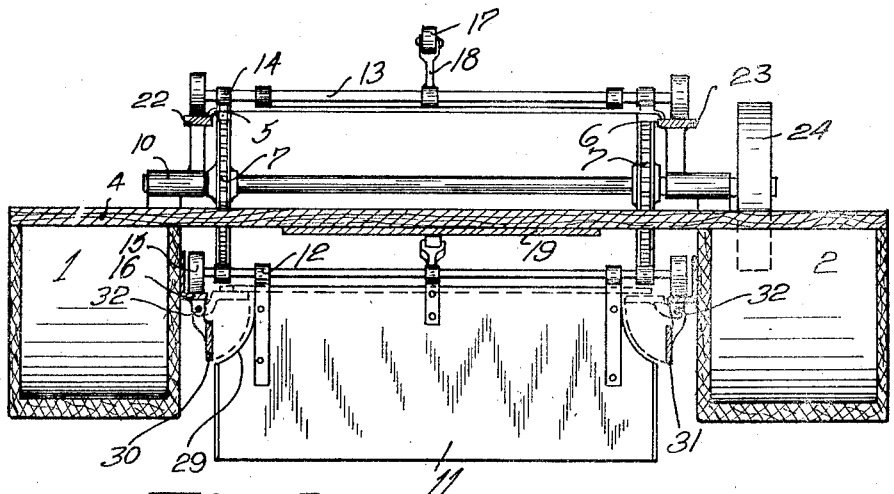
Fig. 3 is a transverse, vertical sectional view, enlarged, at line 3—3 of Fig. 2.

In carrying out my invention, I preferably use a pair of spaced buoyant floats or pontoons as 1 and 2 between which a channel is formed for the operation of the water motor. The pontoons are connected by cross braces as 3 and decks as 4 are fashioned on the pontoons in usual manner.

A pair of endless chains 5 and 6 having sprocket wheels as 7 and shafts 8 and 9, in bearings 10, are provided for operating the water motor. The two shafts are located at opposite ends of the pontoons or floats, and the endless chains extend longitudinally of the float as indicated in Fig. 1. The shafts 8 and 9 are supported above the top of the float, and the endless chains on the sprocket wheels of the shafts are provided with a suitable number of transversely arranged, rectangular blades or paddles 11, fashioned of suitable material. These blades are hinged at 12 to cross rods 13, and the cross rods are attached at 14 to the chains, in order that the blades may be suspended in vertical position perpendicular to the lower flight of the chains, for a working stroke, and in idle position the blades are adapted to lie flat on top of the upper flights of the endless chains as they return to working position. On the ends of the cross rods 13 are provided rollers 15, and these rollers roll over or ride on angle irons 16 which form tracks for the perpendicular blades when in working position. These tracks or angle irons are attached to the adjoining inner sides of the two pontoons above the water line, and the rollers 15 roll over the flange of the angle iron and are retained against displacement by these angular tracks.

Each blade is provided with a presser roller 17 journaled in a bracket 18 carried by each blade and secured to the blade at its central line. While the blade is traveling in operative position as indicated by the arrows in Fig. 2, the guide rollers or presser rollers 17 travel along an overhead guide board 19 which extends longitudinally of the motor and is provided with curved ends 20 and 21. In Fig. 2, it will be seen that the blades flop over to horizontal position as they travel around the shaft 9, when the presser roller 17 of each blade encounters the curved end 21 of the guide board 19. The blade is thus caused to swing around the shaft 9 as an axis, and as it reaches a position for impact by the flowing stream, the blade is brought to vertical position with the presser roller 17 engaging the track 19 and resisting the pressure of the water applied to the blade. The blade is thus held in position to receive pressure from the water and such pressure moves the blade in manner well understood.

The return flight of the endless chains is supported by a pair of overhead tracks 22 and 23 located above the shafts 8 and 9 and in position for the rollers 15 on the ends of the cross rods 13 to roll along. The blades lie flat when traveling along the idle flight of the chains as indicated in Fig. 2.

The pressure of water against the blades of the working flight of the chains operates these chains, and through the sprocket wheels the shaft 8 is rotated. This shaft is provided with a drive pulley 24 and a belt 25 from this pulley extends to a pump pulley 26. A pump is indicated at 27 and the discharge pipe from the pump is indicated at 28. The utility of the water motor is thus indicated, but it will be understood that the power derived therefrom may be applied in different ways and for different purposes.

Figure 4:
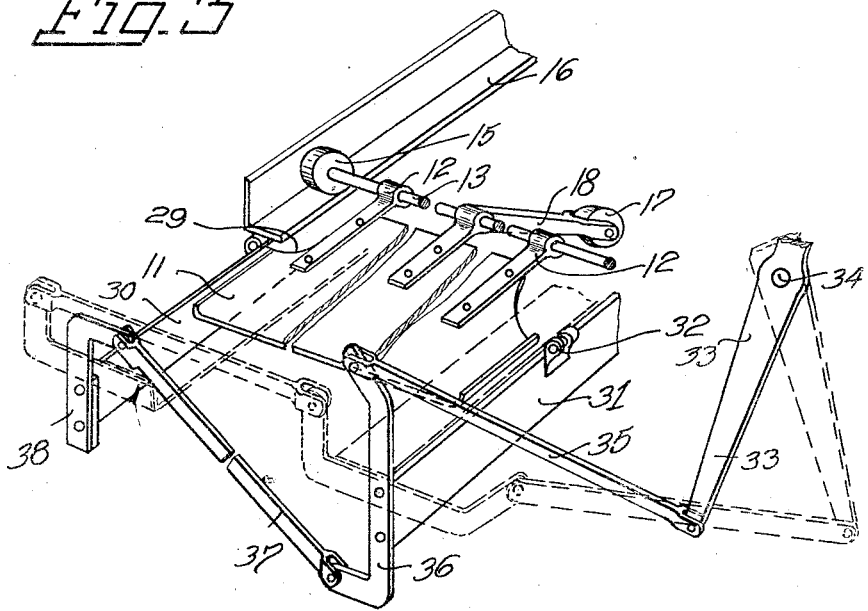
Fig. 4 is a broken perspective view of a blade in unshipped position, together with part of the unshipping mechanism.

When the motor is not required for use, the blades are unshipped, that is, moved to inoperative position along the working flight of the endless chains. In Fig. 3, it will be seen that each of the blades is provided with a pair of cutout corners as 29 to allow the unshipping plates to be set to render the motor inoperative. Beneath the tracks 16 for the rollers 15 are suspended a pair of flat plates 30 and 31 which are hinged at 32 to the under sides of the tracks 16. When the motor is in operation, these plates 30, 31 hang in vertical position as indicated by full lines in Fig. 3, and do not interfere with the movement of the passing blades. To unship the blades, these two flat plates are turned up to horizontal position as indicated by dotted lines in Fig. 3. For this purpose, an operating lever 33 is employed which is pivoted at 34 to a suitable support on the float, and a link 35 connects this lever to a lever arm 36 fixed to the flat plate 31. A pivot link 37 extending transversely of the motor connects the lever arm 36 with another lever arm 38 on the flat plate 30. Thus it will be seen that by swinging the operating lever 33, as indicated by dotted lines and full lines in Fig. 4, the two plates 30 and 31 may be swung on their hinges to horizontal position. The cutout corners 29 of the blades permit this swinging movement of the flat plates. The blades that are in operative position are free to pass to the rear of the float, but succeeding blades, as the one at the right end in Fig. 2, as they swing around the shaft 9, are prevented from assuming operative position. As the outer free edge of the blade encounters the two plates 30 and 31, the blade is held against turning, and the roller 17 is pulled away from the guide board 19. The blade is then unshipped as indicated in Fig. 4 and travels along to the rear of the motor, until all of the blades on the working flight are turned into inoperative position. In this position, the blades are all held above the water line, and out of the way of driftwood or other débris floating down the stream. To start the motor, the lever 33 is operated to swing the plates 30 and 31 to vertical position. Then the horizontal blades on the lower or working flights of the chains are free to swing downwardly to receive pressure from the water, and the motor is started.

Having thus fully described my invention, what I claim as new and desire to secure by Letters Patent, is:—

1. The combination in a water motor of a pair of endless chains and transversely arranged blades carried thereby, of fixed tracks and rollers carried by the blades supported on said tracks, a pair of unshipping plates normally in inoperative position, and means for moving said plates to operative position for unshipping the blades of the working flights of the chains.

2. The combination in a water motor including endless chains and blades carried thereby, of a pair of hinged spaced plates, means for swinging said hinged plates to horizontal position to form tracks for unshipped blades, and said blades having means to permit operation of these unshipping plates.

3. The combination in a water motor with a pair of endless chains and blades on said chains having cutout corners, of a pair of spaced hinged unshipping plates each having a lever arm secured thereto, a link connecting said arms, an operating lever, and a link connecting said lever with one of the lever arms.

In testimony whereof I affix my signature.

WILLIAM KEYWOOD.